(12) United States Patent
Olczak (10) Patent No.: US 7,125,131 B2
(45) Date of Patent: Oct. 24, 2006

(54) BRIGHTNESS ENHANCEMENT FILM WITH IMPROVED VIEW ANGLE

(75) Inventor: Eugene Olczak, Glenville, NY (US)

(73) Assignee: General Electric Company, Schenectady, NY (US)

( * ) Notice: Subject to any disclaimer, the term of this patent is extended or adjusted under 35 U.S.C. 154(b) by 322 days.

(21) Appl. No.: 10/065,981

(22) Filed: Dec. 6, 2002

(65) Prior Publication Data

US 2004/0109663 A1    Jun. 10, 2004

(51) Int. Cl.
F21V 9/14    (2006.01)
F21V 5/02    (2006.01)

(52) U.S. Cl. .......................... 362/19; 362/339; 362/620

(58) Field of Classification Search ................ 362/31, 362/19, 244–246, 331, 334, 339–340, 330, 362/588, 606, 616, 620, 626, 629; 349/64–65, 349/112; 359/625; 385/146, 901
See application file for complete search history.

(56) References Cited

U.S. PATENT DOCUMENTS

| 467,208 A | 1/1892 | Strobel |
| 2,403,731 A | 7/1946 | MacNeille .................. 88/65 |
| 4,542,449 A | 9/1985 | Whitehead .................. 362/330 |
| 4,576,850 A | 3/1986 | Martens .................... 428/156 |
| 4,906,070 A | 3/1990 | Cobb, Jr. ................... 350/286 |
| 4,984,144 A | 1/1991 | Cobb, Jr. et al. ............ 362/339 |
| 5,056,892 A | 10/1991 | Cobb, Jr. .................. 359/831 |
| 5,771,328 A | 6/1998 | Wortman et al. ........... 385/146 |
| 5,797,668 A * | 8/1998 | Kojima et al. .............. 362/31 |
| 5,838,403 A | 11/1998 | Jannson et al. |
| 5,861,990 A | 1/1999 | Tedesco .................... 359/599 |
| 5,914,759 A * | 6/1999 | Higuchi et al. .............. 349/57 |
| 5,917,664 A | 6/1999 | O'Neill et al. .............. 359/831 |
| 5,919,551 A | 7/1999 | Cobb, Jr. et al. ........... 428/156 |
| 5,971,559 A | 10/1999 | Ishikawa et al. |
| 6,002,829 A | 12/1999 | Winston et al. ............ 385/146 |
| 6,044,196 A | 3/2000 | Winston et al. ............ 385/146 |
| 6,052,164 A | 4/2000 | Cobb, Jr. et al. ........... 349/64 |
| 6,091,547 A | 7/2000 | Gardiner et al. ........... 359/625 |
| 6,108,131 A | 8/2000 | Hansen et al. ............. 359/486 |
| 6,130,730 A * | 10/2000 | Jannson et al. ............. 349/65 |
| 6,208,463 B1 | 3/2001 | Hansen et al. ............. 359/486 |
| 6,243,068 B1 | 6/2001 | Evanicky et al. .......... 345/102 |
| 6,277,471 B1 | 8/2001 | Tang ....................... 428/172 |
| 6,280,063 B1 | 8/2001 | Fong et al. ................ 362/333 |
| 6,322,236 B1 | 11/2001 | Campbell et al. .......... 362/333 |

(Continued)

FOREIGN PATENT DOCUMENTS

EP    0592 241    4/1994

(Continued)

OTHER PUBLICATIONS

PCT International Search Report dated Aug. 5, 2004.

Primary Examiner—Sandra O'Shea
Assistant Examiner—Guiyoung Lee
(74) Attorney, Agent, or Firm—Foley & Lardner LLP (57) ABSTRACT

A structural shape on the surface of an optical substrate is such that the brightness of diffuse light departing from the surface of the optical substrate at certain off axis angles is reduced, at the expense of a small reduction in peak brightness measured near the viewing axis. The net result is an overall increase in useful illumination. A cross section of a prism as the structural shape has a curved sidewall or facet. A material with a relatively high index of refraction combined with a prismatic structure having a modified prism geometry improves brightness.

19 Claims, 7 Drawing Sheets

U.S. PATENT DOCUMENTS

| | | | |
|---|---|---|---|
| 6,335,999 B1 | 1/2002 | Winston et al. | 385/146 |
| 6,354,709 B1 | 3/2002 | Campbell et al. | 362/31 |
| 6,356,391 B1 | 3/2002 | Gardiner et al. | 359/628 |
| 6,456,437 B1 | 9/2002 | Lea et al. | 359/625 |
| 2001/0053075 A1 | 12/2001 | Parker et al. | |
| 2002/0061178 A1 | 5/2002 | Winston et al. | 385/133 |
| 2002/0080598 A1 | 6/2002 | Parker et al. | 362/31 |
| 2002/0097496 A1* | 7/2002 | Lu | 359/628 |
| 2002/0101659 A1 | 8/2002 | Hansen et al. | 359/486 |
| 2002/0141060 A1 | 10/2002 | Lu et al. | |
| 2004/0075897 A1* | 4/2004 | Ookawa et al. | 359/455 |

FOREIGN PATENT DOCUMENTS

| | | |
|---|---|---|
| JP | 09101520 | 4/1997 |
| JP | 2001133614 | 5/2001 |
| WO | WO 98/33006 | 7/1998 |
| WO | WO 99/42861 | 8/1999 |
| WO | WO 99/59005 | 11/1999 |
| WO | WO 99/63397 | 12/1999 |
| WO | WO 01/27527 | 4/2001 |
| WO | WO 01/27663 | 4/2001 |
| WO | WO 01/79923 | 10/2001 |

* cited by examiner

— Right Angle Prism
— Case 1
— Case 2

BRIGHTNESS ENHANCEMENT FILM WITH IMPROVED VIEW ANGLE

BACKGROUND OF THE INVENTION

This invention relates to brightness enhancement films and, more specifically to such films having curved facet prism structures and increased prism peak angles and refractive indices.

In backlight computer displays or other systems, optical films are commonly used to direct light. For example, in backlight displays, brightness enhancement films use prismatic structures to direct light along the viewing axis (i.e., an axis normal to the display, or "on axis"). This enhances the brightness of the light viewed by the user of the display and allows the system to use less power to create a desired level of on-axis illumination. Films for turning light can also be used in a wide range of other optical designs, such as for projection displays, traffic signals, and illuminated signs.

Backlight displays and other systems use layers of films stacked and arranged so that the prismatic surfaces thereof are perpendicular to one another and are sandwiched between other optical films known as diffusers. Diffusers have highly irregular surfaces.

The use of current commercial brightness enhancement films causes a sharp cut-off in brightness between about 40 and 50 degrees off-axis. At angles beyond this cut-off there are side-lobes in the angular brightness distribution. These side-lobes can result in a waste of energy because they are outside the desired viewing angle specifications of many liquid crystal display (LCD) devices. The side-lobes are also undesirable in security applications since they allow light to reach unintended viewers.

Thus, there is a continuing and demonstrated need in the prior art for brightness enhancement films which suppress sidelobes in the angular distribution of brightness.

SUMMARY OF THE INVENTION

In a first embodiment, the invention features a structural shape for the surface of an optical substrate such that the brightness of diffuse light departing from the surface of the optical substrate at certain off axis angles is reduced, at the expense of a small reduction in peak brightness measured near the viewing axis. The net result is an overall increase in useful illumination. Such an optical substrate comprises a surface characterized by a cross section of at least one prism having a curved sidewall or facet.

In a second embodiment, the invention features a combination of a high index of refraction prismatic structure with a modified prism geometry. Brightness performance is met or exceeded, for example in an LCD back light display device, when the index of refraction of the prism structure is increased to a value above the index of refraction of materials commonly used in brightness enhancement films, while the peak angle is allowed to increase beyond 90 degrees.

BRIEF DESCRIPTION OF THE DRAWINGS

FIG. 8 is a map of the central luminance of crossed optical substrates as a function of the prism peak angle and the refractive index of the substrate wherein.

DETAILED DESCRIPTION OF THE INVENTION

Figure 1:
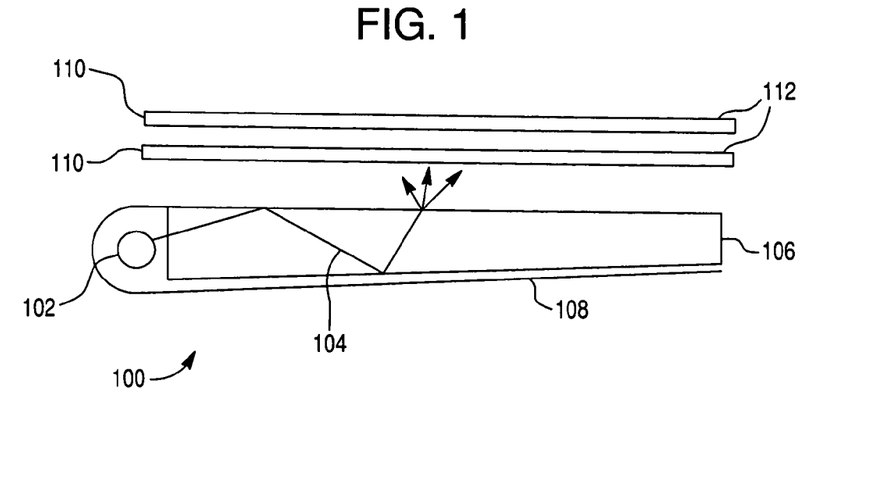
FIG. 1 is a cross sectional view of a backlight display device.

In FIG. 1 a cross sectional view of a backlight display device 100 is shown. The backlight display device 100 comprises an optical source 102 for generating light 104. A light guide 106 guides the light 104 therealong by total internal reflection (TIR). The light guide 106 contains disruptive features that cause the light 104 to escape the light guide 106. A reflective substrate 108 positioned along the lower surface of the light guide 106 reflects any light 104 escaping from the lower surface of the light guide 106 back through the light guide 106 and toward an optical substrate 110. At least one optical substrate 110 is receptive of the light 104 from the light guide 106. The optical substrates 110 comprise a three-dimensional surface 112 defined by prismatic structures 116 (FIGS. 2, 3 and 4).

Figure 7:
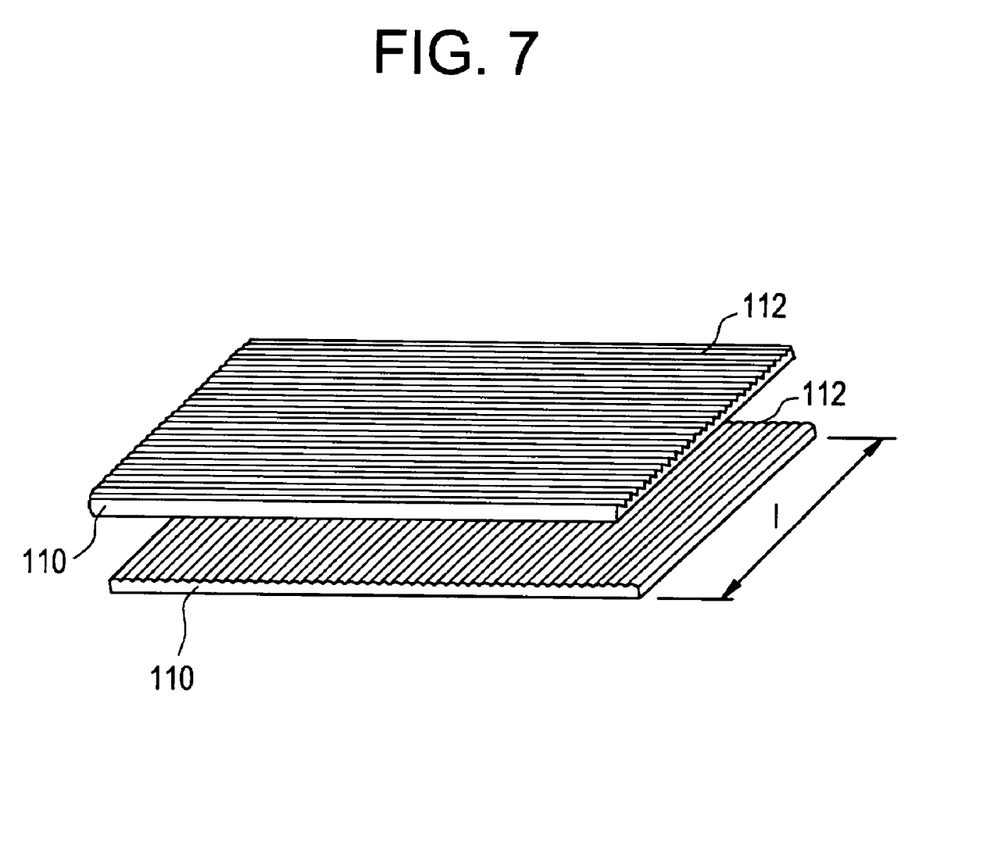
FIG. 7 is a perspective view of two optical substrates positioned in a crossed configuration wherein prismatic structures are positioned at an angle with respect to one another (e.g., 90 degrees).

The optical substrates 110 may be positioned, one above the other, in a crossed configuration wherein the prismatic structures 116 are positioned at an angle with respect to one another (e.g., 90 degrees) as seen in FIG. 7. The prisms 116 have a prescribed peak angle, $\alpha$, a height, h, a length, l, and a pitch, p and one or both of the prismatic surfaces 112 may be randomized in their peak angle, $\alpha$, height, h, length, l, and pitch, p. Yet further, one or both sides of the substrates 110 may have the prisms 116.

Figure 2:
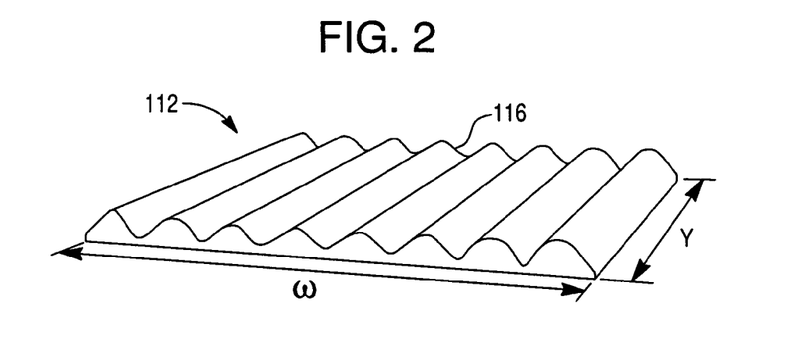
FIG. 2 is a perspective view of an optical substrate comprising a surface characterized by a cross section of a prism having a curved sidewall or facet.
Figure 3:
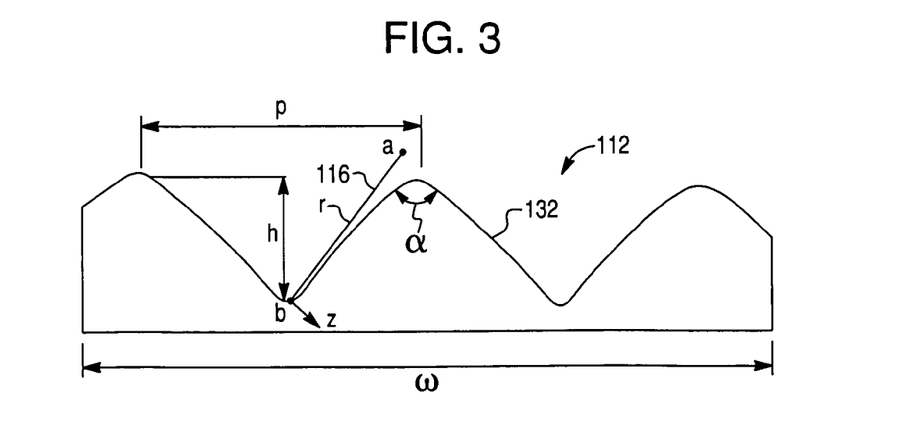
FIG. 3 is a first cross sectional view of an optical substrate comprising a surface characterized by a cross section of a prism having a curved sidewall or facet.
Figure 4:
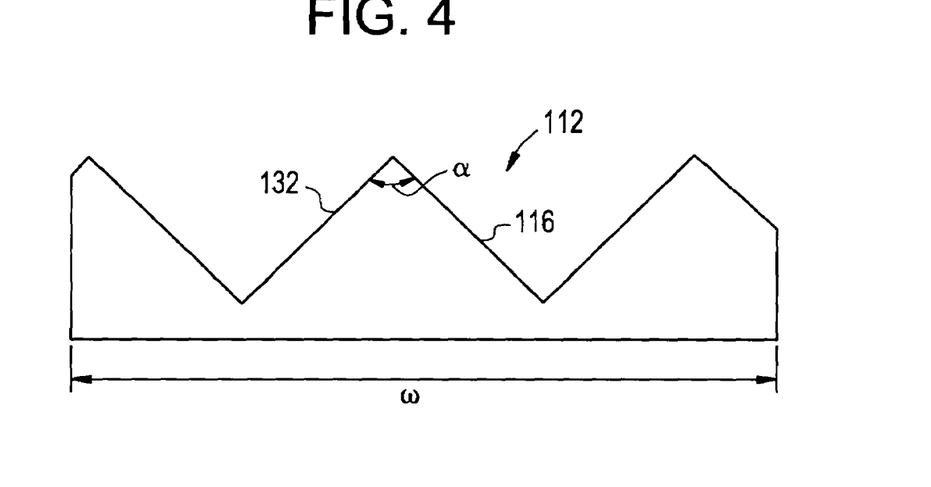
FIG. 4 is a second cross sectional view of an optical substrate comprising a surface characterized by a cross section of a prism having a curved sidewall or facet.
Figure 6:
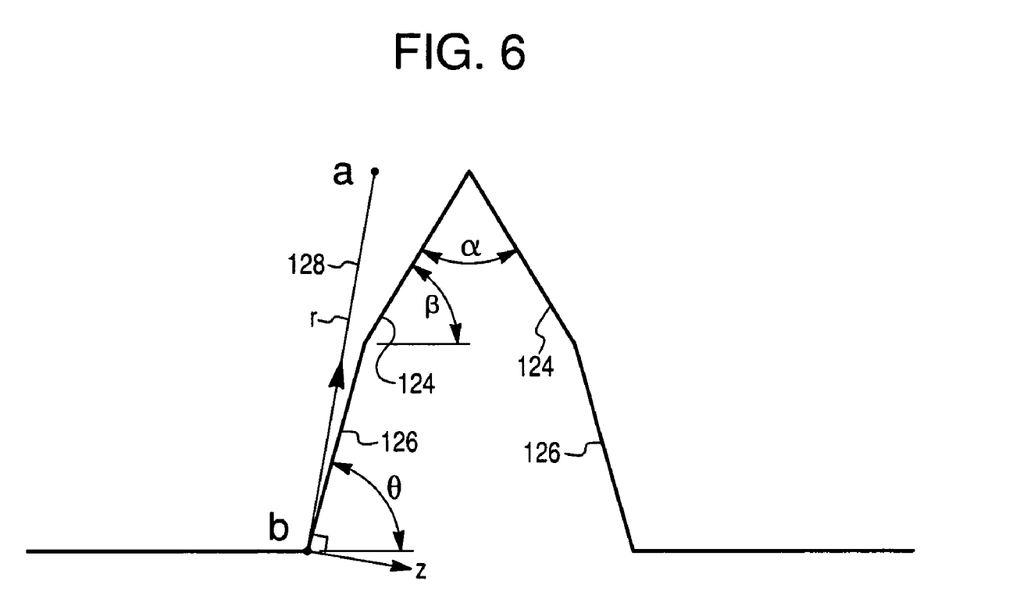
FIG. 6 is a cross sectional view of a compound angle prism and of the geometric parameters of the curved sidewall or facet of FIGS. 3 and 4 as described by a segment of a polynomial function.

In FIGS. 2, 3 and 4, in a first embodiment of the invention, the sidewall or facets 132 of the prisms 116 which comprise the surface 112 are curved. The curvature can be described as a segment of a parabola, or more generally as a polynomial surface given by the sag equation:

$$z = \frac{cr^2}{1+\sqrt{1-(1+k)c^2 r^2}} + dr^2 + er^4 + fr^6 + \text{Higher order terms in } r \quad (1)$$

where z is the perpendicular deviation (or "sag") in microns of the sidewall or facet 132 of the prisms 116 from a straight reference line 128, originating at a first reference point (b) at a base of the prism and terminating at a second reference point (a) near the peak of the prism (see FIG. 6) and $c^{-1}$ is the radius of curvature of the facet. The distance along reference line 128 is given by r. Here the coefficients of the polynomial may have the following approximate ranges: $-20 < c < 20$, $-10 < d < 10$, $-10 < e < 10$, $-10 < f < 10$, and $-1 < k$ or less than or equal to zero. It is noted that $c^2 r^2$ is greater than or equal to zero and less than or equal to 1. Odd order terms in r (e.g., $r^1$, $r^3$, $r^5$, $r^7$, etc.) with appropriately chosen coefficients may also be used as in Eq. 1. The higher order terms for the even and odd order terms have appropriately chosen coefficients. Terms other than the first $r^2$ term may be written as:

$$\sum_{i=1}^{N} a_i r^i.$$

Linear segments 124, 126 or other approximations to the polynomial described by Eq. 1 may also be used as seen in FIG. 6. Linear segments 124, 126 result in a compound angle prism having a first facet 126 at an angle of θ and a second facet 124 at an angle of β. As best understood from FIG. 6, the curvature of the curved sidewall or facet 132 of the prisms 116 can be either convex or concave. In FIG. 6, the side facets of the prism are positioned so as to form one or more compound facets 124, 126, respectively subtending an angle of β or θ with the base of the prism.

Figure 5:
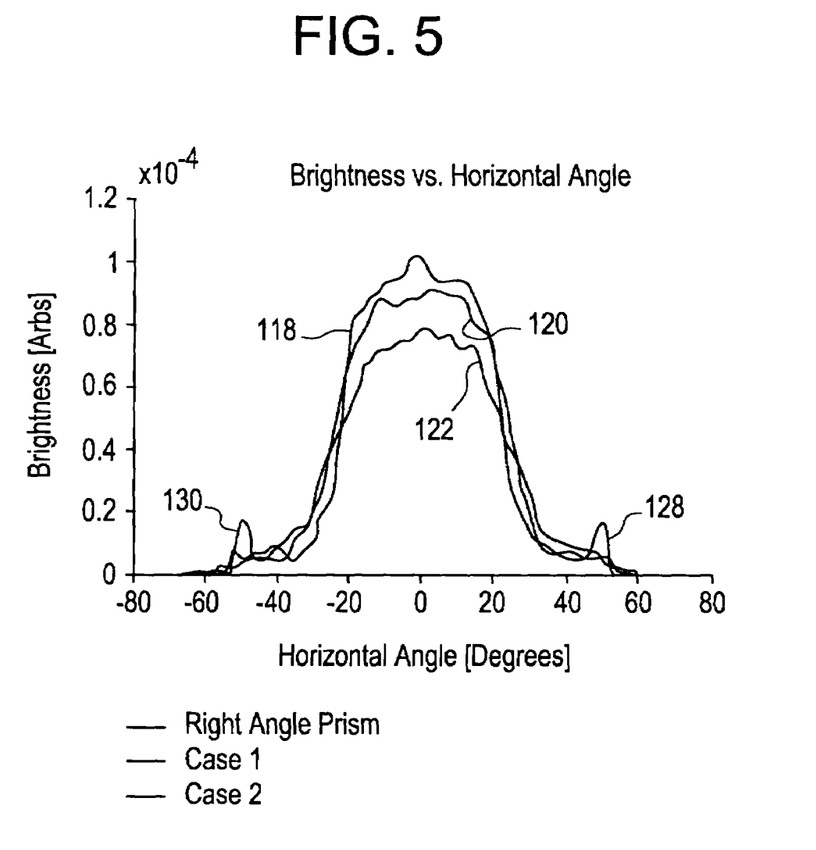
FIG. 5 is a graphical depiction of brightness as a function of horizontal viewing angle for an optical substrate comprising a surface characterized first by a cross section of a right angle prism, second by the curved sidewall or facet in FIG. 3 and third by the curved sidewall or facet in FIG. 4.

Sample cross sections of the prisms 116, over a width w, are shown is FIGS. 2, 3 and 4. FIG. 5 is a graphical depiction of brightness as a function of horizontal viewing angle for an optical substrate comprising a surface characterized first 118 by a cross section of a right angled, straight-sided prism, second 122 by the curved sidewall or facet in FIG. 3, and third 120 by the curved sidewall or facet in FIG. 4. As can be seen in FIG. 5, for a right angled, straight-sided prism 118 the brightness shows significant side lobes 128, 130 at a horizontal view angle of approximately +/−50 degrees. These sidelobes are not seen in either of the curved faceted prisms of FIGS. 3 and 4. However, there is a slight reduction in overall brightness for the curved prisms. As seen by comparing graph 122 with graph 120 in FIG. 5, for a refractive index of approximately 1.6 in the optical substrate the steeper the curvature of the side wall the greater the reduction in overall brightness. Also, as seen in FIG. 5, as the curvature of the facets increases away from the straight wall of a 90 degree prism, the wider is the central lobe and the lower is the central luminance and the sidelobes.

Figure 8:
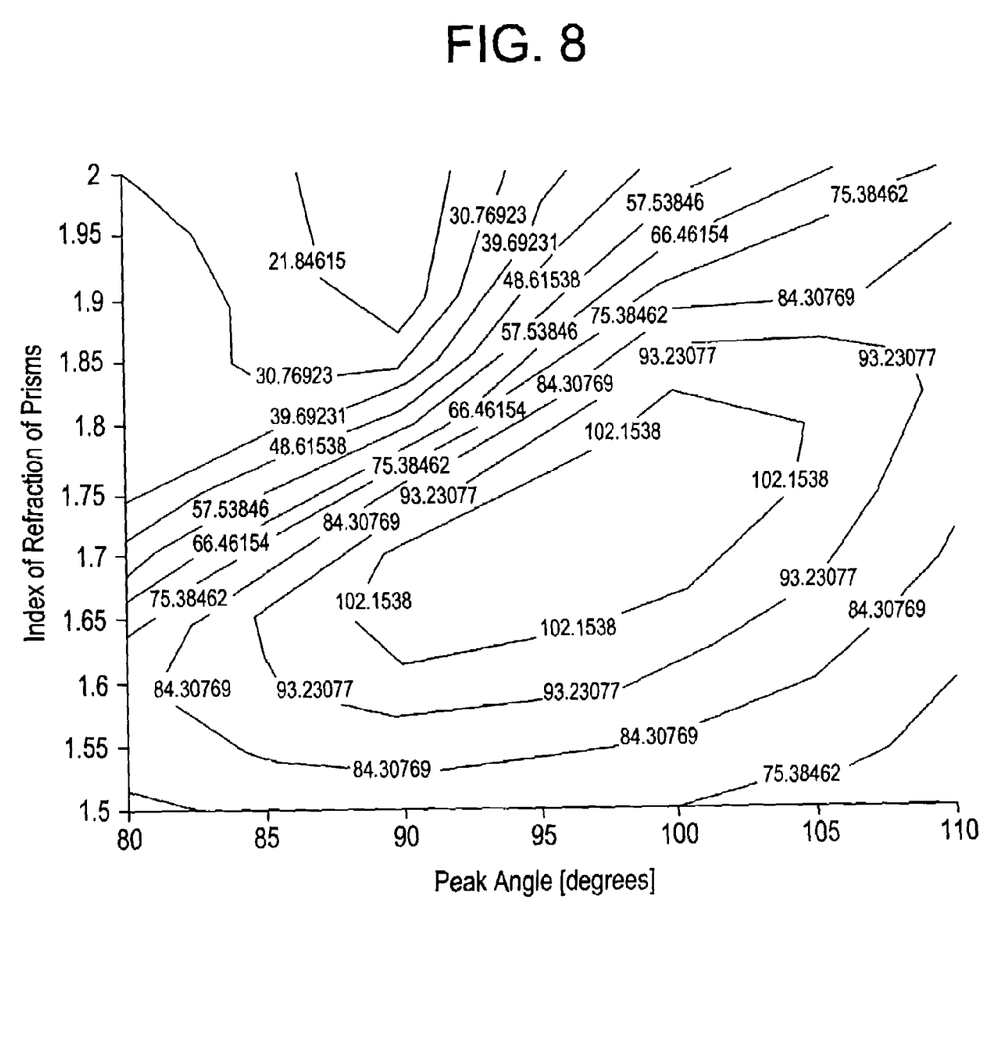

In a second embodiment, a relatively high index of refraction for the optical substrate 110 in combination with a modified prism geometry yields an enhanced brightness. In particular, FIG. 8 displays a map of the central luminance in per cent of crossed optical substrates as a function of the prism peak angle and the refractive index of the substrate, wherein a refractive index of 1.6 and a peak angle of 90 degrees is taken to be 100 per cent. By increasing the peak angle to 100 degrees and increasing the refractive index of the optical substrate generally to greater than about 1.65 and in particular to between approximately 1.7 and 1.8, the luminance is at least 102 per cent.

Figure 9:
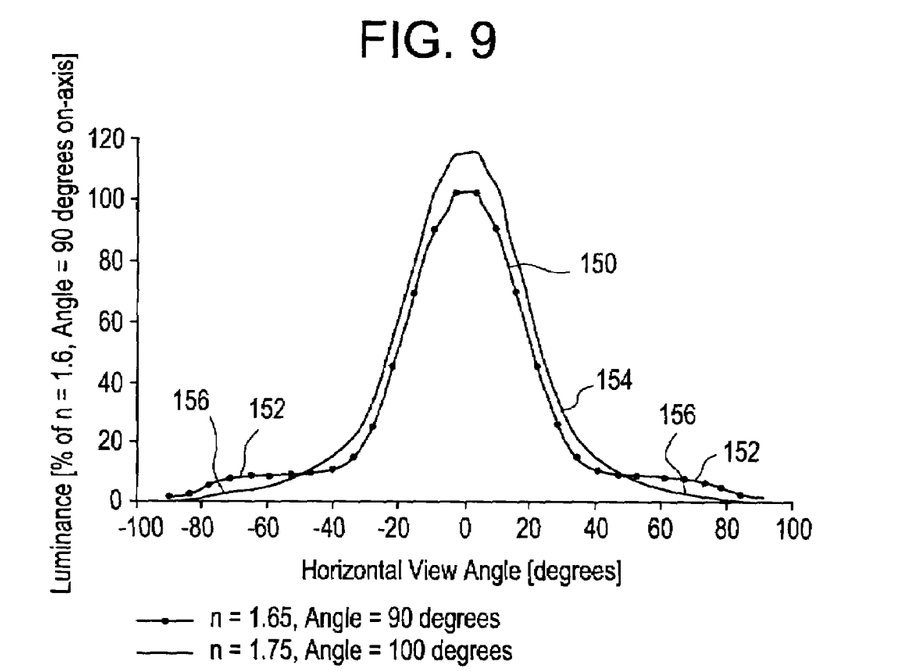
FIG. 9 is a graphical depiction of the far field horizontal luminance of crossed optical substrates as a function of horizontal viewing angle.

FIG. 9 shows a graphical depiction of the far field horizontal luminance of crossed optical substrates as a function of horizontal viewing angle. In FIG. 9, a prior art luminance profile, based upon a refractive index of 1.65 and a peak prism angle of 90 degrees is shown at 150. As can be seen in FIG. 9, the prior art shows sidelobes at 152. By increasing the refractive index of the substrates to about 1.75 and the peak prism angle to about 100 degrees, as seen at 154, the central portion of the luminance profile (e.g. +/−30 degrees) displays a higher peak luminance (about 118) with essentially no sidelobes 156.

Figure 10:
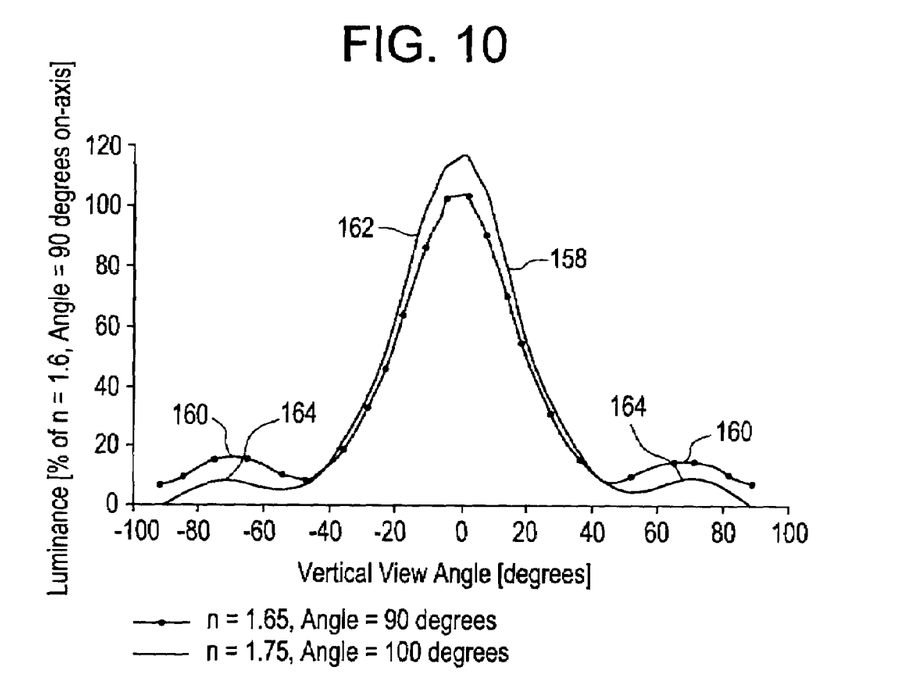
FIG. 10 is a graphical depiction of the far field vertical luminance of crossed optical substrates as a function of vertical viewing angle.

Similarly, FIG. 10 shows a graphical depiction of the far field vertical luminance of crossed optical substrates as a function of vertical viewing angle. In FIG. 10, a prior art luminance profile, based upon a refractive index of 1.65 and a peak prism angle of 90 degrees is shown at 158. As can be seen in FIG. 10, the prior art shows sidelobes at 160. By increasing the refractive index of the substrates to about 1.75 and the peak prism angle to about 100 degrees, as seen at 162, the central portion of the luminance profile (e.g. +/−30 degrees) displays a higher peak luminance (about 118) with suppressed sidelobes 164.

Figure 11:
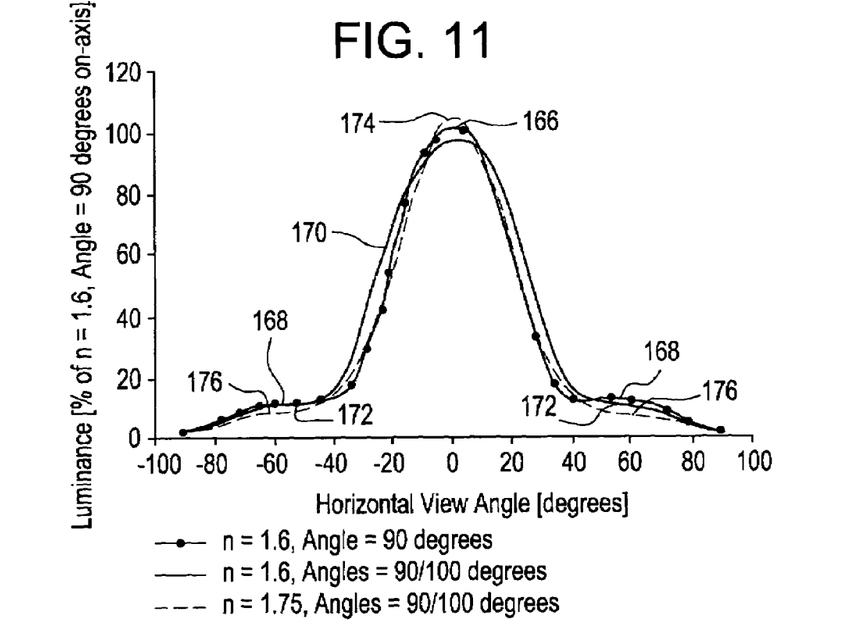
FIG. 11 is a graphical depiction of the far field horizontal luminance of crossed optical substrates as a function of horizontal viewing angle.

FIG. 11 shows a graphical depiction of the far field horizontal luminance of crossed optical substrates as a function of horizontal viewing angle. In FIG. 11, a prior art luminance profile, based upon a refractive index of 1.60 and a peak prism angle of 90 degrees is shown at 166. As can be seen in FIG. 11, the prior art shows sidelobes at 168. As further seen at 170 in FIG. 11, by increasing the peak angle from 90 degrees to about 100 degrees while keeping the refractive index of the substrate at 1.60, the sidelobes 172 are reduced slightly while the central segment of the luminance is only slightly less. Still further, by increasing the refractive index of the substrates to about 1.75 and the peak prism angle to about 100 degrees, as seen at 174, the central portion of the luminance profile (e.g. +/−30 degrees) displays a slightly higher peak luminance (about 105) with slightly lower sidelobes 176.

Figure 12:
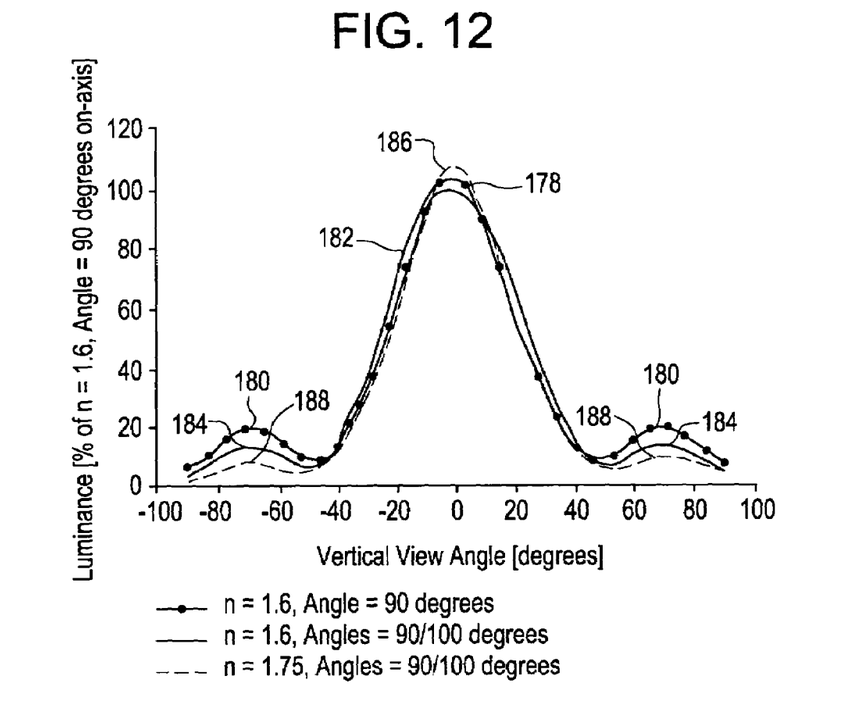
FIG. 12 is a graphical depiction of the far field vertical luminance of crossed optical substrates as a function of vertical viewing angle.

Similarly, FIG. 12 shows a graphical depiction of the far field vertical luminance of crossed optical substrates as a function of vertical viewing angle. In FIG. 12, a prior art luminance profile, based upon a refractive index of 1.60 and a peak prism angle of 90 degrees is shown at 178. As can be seen in FIG. 12, the prior art shows sidelobes at 180. As further seen at 182 in FIG. 12, by increasing the peak angle from 90 degrees to about 100 degrees while keeping the refractive index of the substrate at 1.60, the sidelobes 184 are reduced while the central segment of the luminance is only slightly less. Still further, by increasing the refractive index of the substrates to about 1.75 and the peak prism angle to about 100 degrees, as seen at 186, the central portion of the luminance profile (e.g. +/−30 degrees) displays a higher peak luminance (about 105) with slightly lower sidelobes 188.

Thus, it can be seen from FIGS. 8–12 that by increasing the refractive index of the substrate 110 and/or by increasing the peak angle, α, of the prism structures 116, an improvement is realized in an increase in the on-axis luminance of the optical substrate 110 as well as a reduction in the energy sidelobes of the horizontal and vertical luminance profile.

The optical substrate 110 may be formed from an optically transparent polymer, an ultraviolet (UV) curable organic or inorganic material (or hybrid thereof). In such an optical substrate 110, an index of refraction of greater than about 1.65 is preferred.

Aside from the use of the optical substrates 110 described above in backlight displays for brightness enhancement, the substrates can be used in a wide variety of other applications as well. Embodiments of the substrates 110 can be used in Fresnel lenses, hybrid glass/plastic lenses, optical disks, diffuser films, holographic substrates or in combination with conventional lenses, prisms or mirrors. Such embodiments could be formed by modulating concentric circles or ellipses having fixed characteristics. The optical substrates can also be used in single or multi-order reflective, transmissive or partially transmissive, devices, whether light absorbing or non light absorbing; prisms, holographic optical elements, or diffraction gratings. The substrates can be used in other applications such as projection displays, illuminated signs, and traffic signals. Another property of the invention is that the curved (or compound angle) facets increase the blurring of the light guide features. This is an advantage since it enhances the visual appearance of the display.

Any references to first, second, etc., or front and back, right and left, top and bottom, upper and lower, and horizontal and vertical or any other phrase relating one variable or quantity to another, unless noted otherwise, intended for the convenience of the description of the invention, and are not intended to limit the present invention or its components to any one positional or spatial orientation. All dimensions of the components in the attached Figures can vary with a potential design and the intended use of an embodiment without departing from the scope of the invention.

While the invention has been described with reference to several embodiments thereof, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An optical substrate comprising:
   a surface comprising a prism structure characterized by a cross section having a curved facet described by the equation $$z = \frac{cr^2}{1 + \sqrt{1 - (1+k)c^2 r^2}} + dr^2 + er^4 + fr^6,$$

wherein z is the perpendicular deviation of the surface of the facet of the prism from a straight line originating at a first reference point and terminating at a second reference point and the coefficients of the polynomial lie within the following approximate ranges: $-20 < c < 20$; $-10 < d < 10$; $-10 < e < 10$; $-10 < f < 10$ and $-1 < k$ is less than or equal to zero and where r the distance along the straight line from the first reference point, wherein the prism structure comprises a plurality of prisms having a prescribed peak angle, $\alpha$, a height, h, a length, l, and a pitch, p, and the plurality of prisms include at least a pseudorandom peak angle, $\alpha$, height, h, length, l, or pitch, p.

2. The optical substrate as set forth in claim 1 wherein a peak angle of the prism is greater than 90 degrees and less than 105 degrees and the refractive index of the substrate is between approximately 1.65 and 1.8.

3. The optical substrate as set forth in claim 2 wherein the peak angle is 100 degrees.

4. The optical substrate as set forth in claim 1 wherein the prism structure is an ultraviolet curable organic or inorganic material.

5. The optical substrate as set forth in claim 1 wherein the prism structure includes a peak angle of greater than approximately 94 degrees and wherein c, d, e, f, and k are approximately equal to zero.

6. The optical substrate as set forth in claim 1 wherein the equation for z includes higher order terms in r defined by the summation $$\sum_{i=1}^{N} a_i r^i$$

where $a_i$ are coefficients and N is an integer.

7. An optical substrate comprising:
   a surface comprising a prism structure characterized by a peak angle of greater than 100 degrees and less than 105 degrees and a refractive index of between approximately 1.65 and 1.8.

8. The optical substrate as set forth in claim 7 wherein the prism structure is an ultraviolet curable organic or inorganic material.

9. A backlight display device comprising:
   an optical source for generating light;
   a light guide for guiding the light therealong including a reflective device positioned along the light guide for reflecting the light out of the light guide;
   an optical substrate receptive of the light from the reflective device, the optical substrate comprising;
   a first surface and a second surface opposing the first surface, the first surface arranged closer to the light guide than the second surface, the second surface comprising a prism structure characterized by a cross section having a curved facet, wherein a peak angle of the prism is greater than 100 degrees and less than 105 degrees and the refractive index of the substrate is between approximately 1.65 and 1.8.

10. The backlight display device as set forth in claim 9 wherein the curved facet is described by a segment of a polynomial function.

11. The backlight display device as set forth in claim 9 wherein the segment of the polynomial function is described by the equation $$z = \frac{cr^2}{1 + \sqrt{1 - (1+k)c^2 r^2}} + dr^2 + er^4 + fr^6,$$

wherein z is the perpendicular deviation of the surface of the facet of the prism from a straight line originating at a first reference point and terminating at a second reference point and the coefficients of the polynomial lie within the following approximate ranges: −20 <c <20; −10 <d <10; −10 <e <10; −10 <f <10 and −1 k is less than or equal to zero and where r is the distance along the straight line from the first reference point.

12. The backlight display device as set forth in claim 11 wherein the optical substrate is formed with an optically transparent material with an index of refraction of approximately 1.75.

13. The optical substrate as set forth in claim 11 wherein the prism structure includes a peak angle of greater than approximately 94 degrees and wherein c, d, e, f, and k are approximately equal to zero.

14. The optical substrate as set forth in claim 11 wherein the equation for z includes higher order terms in r defined by the summation $$\sum_{i=1}^{N} a_i r^i$$

where ai are coefficients and N is an integer.

15. The backlight display device as set forth in claim 9 wherein the peak angle is 100 degrees.

16. The backlight display device as set forth in claim 9 wherein the optical substrate is formed with an optically transparent material.

17. The backlight display device as set forth in claim 7 wherein the prism structure is an ultraviolet curable organic or inorganic material.

18. An optical substrate comprising:
a surface comprising a prism structure characterized by a cross section having a plurality of facets including a first facet oriented at a first angle with respect to the surface of the prism and a second facet oriented at a second angle with respect to the surface of the prism;
wherein the first and second facets intersect at one side of a centerline of the prism and the first and second angles are different, and
wherein a peak angle of the prism structure is greater than 100 degrees and less than 105 degrees, and the refractive index of the substrate is between approximately 1.65 and 1.8.

19. The optical substrate as set forth in claim 18 wherein the prism structure is an ultraviolet curable organic or inorganic material.

* * * * *